United States Patent
Yamamoto (10) Patent No.: US 12,299,860 B2
(45) Date of Patent: May 13, 2025

(54) ELECTRONIC DEVICE, DETERMINATION METHOD, AND STORAGE MEDIUM

(71) Applicant: CASIO COMPUTER CO., LTD., Tokyo (JP)

(72) Inventor: Tatsuya Yamamoto, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 324 days.

(21) Appl. No.: 17/903,609

(22) Filed: Sep. 6, 2022

(65) Prior Publication Data

US 2023/0070806 A1    Mar. 9, 2023

(51) Int. Cl.
| | |
|---|---|
| *B41J 3/407* | (2006.01) |
| *A45D 29/00* | (2006.01) |
| *G06T 7/00* | (2017.01) |
| *G06V 10/22* | (2022.01) |
| *G06V 10/25* | (2022.01) |
| *G06V 10/75* | (2022.01) |
| *G06V 40/10* | (2022.01) |

(52) U.S. Cl.
CPC .......... *G06T 7/0002* (2013.01); *A45D 29/00* (2013.01); *B41J 3/4073* (2013.01); *G06V 10/22* (2022.01); *G06V 10/25* (2022.01); *G06V 10/75* (2022.01); *A45D 2029/005* (2013.01); *G06T 2207/10024* (2013.01); *G06T 2207/30144* (2013.01); *G06T 2207/30196* (2013.01); *G06V 40/107* (2022.01)

(58) Field of Classification Search
CPC ......... G06T 7/0002; G06T 2207/30196; G06T 2207/10024; G06T 2207/30144; A45D 29/00; A45D 2029/005; B41J 3/4073; G06V 10/22; G06V 10/75; G06V 10/25; G06V 40/107

See application file for complete search history.

(56) References Cited

U.S. PATENT DOCUMENTS

2017/0367459 A1*  12/2017  Yamasaki ................ B41J 29/02

FOREIGN PATENT DOCUMENTS

| JP | 2018107665 A | * | 7/2018 | ............. H04N 5/232 |
| JP | 2020103448 A | * | 7/2020 | ............. A45D 29/00 |
| JP | 2021-081149 A | | 5/2021 | |

OTHER PUBLICATIONS

JPO; Application No. 2021-145595; Notice of Reasons for Refusal dated Apr. 18, 2023.

* cited by examiner

*Primary Examiner* — Yaovi M Ameh
(74) *Attorney, Agent, or Firm* — Fitch, Even, Tabin & Flannery LLP (57) ABSTRACT

Disclosed is an electronic device including at least one processor that: performs control to obtain a finger image including a nail which is a printing target and at least one photographed image including a specific part a state of which changes over time; and determines the state of the specific part based on a comparison result between the photographed image and a comparison image that is obtained by photographing a range including the specific part in a first state.

10 Claims, 5 Drawing Sheets

ELECTRONIC DEVICE, DETERMINATION METHOD, AND STORAGE MEDIUM

CROSS-REFERENCE TO RELATED APPLICATIONS

This application is based upon and claims the benefit of priority from the prior Japanese Patent Application No. 2021-145595, filed on Sep. 7, 2021, the entire contents of which are incorporated herein by reference.

BACKGROUND

Technical Field

The present disclosure relates to an electronic device, a determination method, and a storage medium.

Description of Related Art

In recent years, printing devices (nail printing devices) have been known to print various designs on printing targets such as human nails.

In such a printing device, it is necessary to place the finger including the nail to be printed, etc., in a specific position and properly adjust its position before printing.

For example, JP 2020-103448 A describes a configuration in which a mirror is installed near the placement unit at which the printing target (e.g., fingernail) is placed, so that position adjustment of the printing target can be easily performed.

SUMMARY

According to an aspect of the present disclosure, there is provided an electronic device including at least one processor that: performs control to obtain a finger image including a nail which is a printing target and at least one photographed image including a specific part a state of which changes over time; and determines the state of the specific part based on a comparison result between the photographed image and a comparison image that is obtained by photographing a range including the specific part in a first state.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein.

DETAILED DESCRIPTION OF EMBODIMENTS

An embodiment of an electronic device, a determination method and a storage medium according to the present disclosure will be described with reference to FIGS. 1 to 7.

The embodiment described below is provided with various limitations technically preferable for carrying out the present disclosure. However, the scope of the present disclosure is not limited to the embodiment below or illustrated examples.

Figure 1:
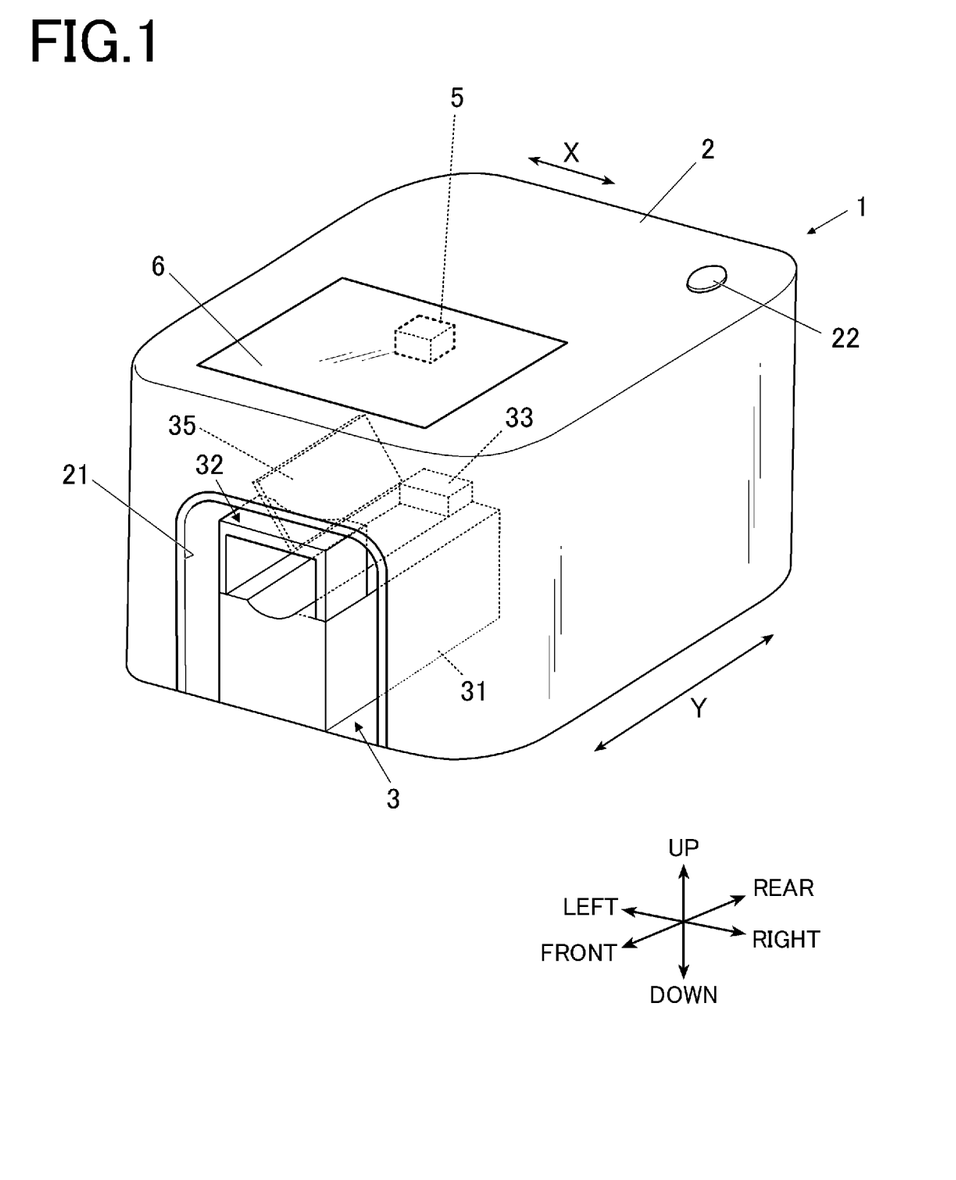
FIG. 1 is a main part diagram showing the outer configuration of the printing device in the present embodiment.
Figure 2:
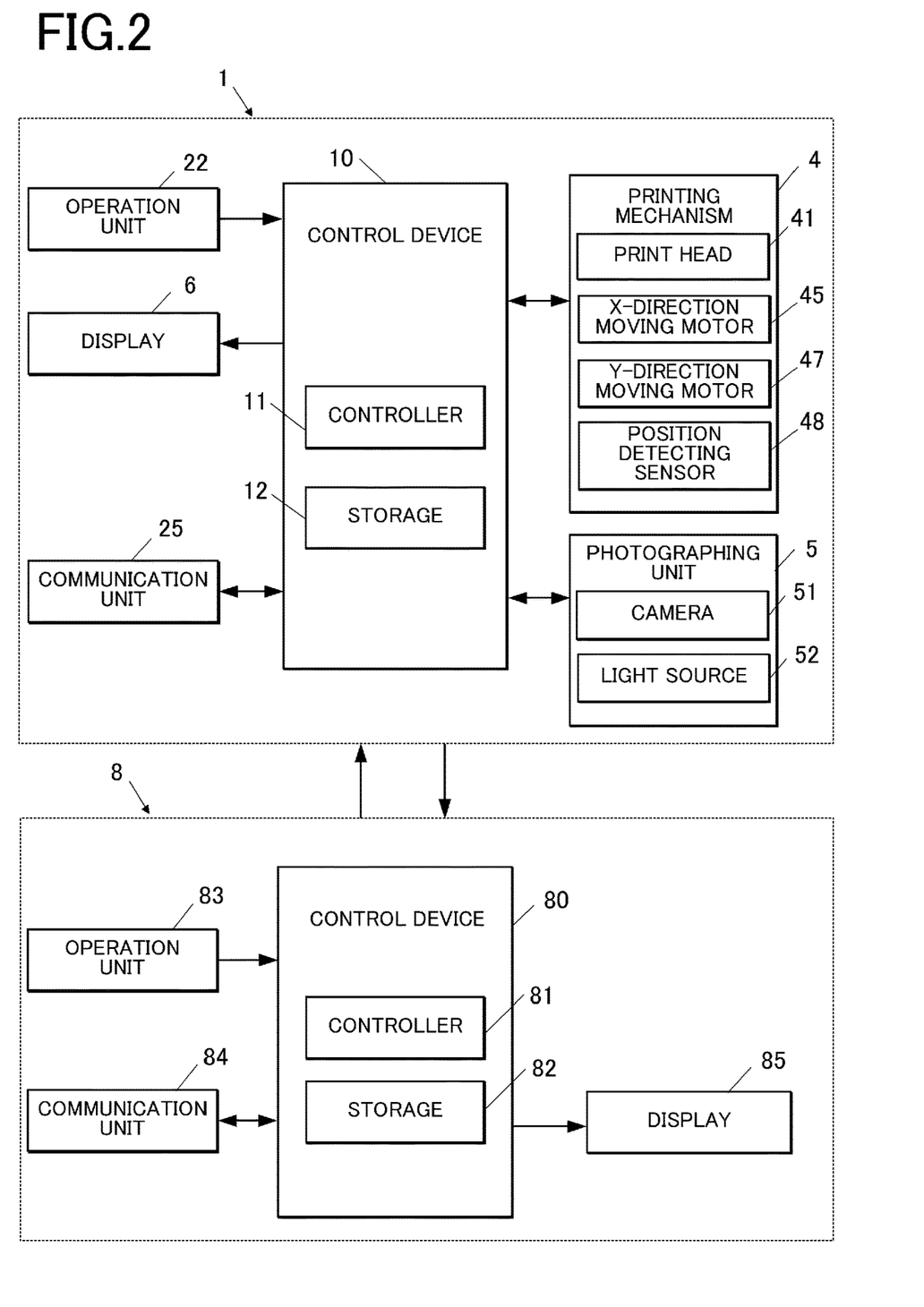
FIG. 2 is a main part block diagram showing the control configuration of the printing device and the terminal device that cooperates with the printing device in the present embodiment.

The electronic device in the embodiment is a printing device (nail printing device) that performs printing on printing targets such as fingernails of hands. The electronic device in the present disclosure is not limited to the printing device that performs printing on printing targets such as fingernails of hands FIG. 1 is a perspective view showing the main part outer configuration of a printing device which is the electronic device in the embodiment. FIG. 2 is a block diagram showing the functional configuration of the printing device and the terminal device that cooperates with the printing device in the embodiment.

In the following embodiment, the up, down, left, right, front and rear refer to the directions shown in FIG. 1. Furthermore, the X direction and the Y direction refer to the directions shown in FIG. 1.

As shown in FIG. 1, the printing device 1 includes a housing 2 which is formed in a nearly box shape.

The housing 2 includes an opening 21 which is widely open in a nearly central portion in the left-right direction (horizontal direction of printing device 1, left-right direction in FIG. 1, X direction) in the lower section on the front surface side (front surface side of printing device 1, front side in FIG. 1) of the housing 2. The opening 21 is at least wide enough to allow a finger to move in and out of the device. The opening 21 may be wide enough to allow a hand to move in and out of the device.

An operation unit 22 is provided on the upper surface (top plate), lateral surface or the like of the housing 2. The operation unit 22 is a functional unit for a user to perform various types of input. In the embodiment, an example of providing the operation unit 22 on the upper surface of the housing 2 is illustrated.

The operation unit 22 is a power switch button to turn on the power of the printing device 1, and a stop switch button to stop the operation, for example. When the operation unit 22 is operated, the instruction signal according to the operation is output to an after-mentioned controller 11.

Though the operation unit 22 is configured by a single button in the illustrated example, the operation unit 22 may be configured by multiple buttons provided on the upper surface of the housing 2, or the like.

When a touch panel is integrally formed with the surface of an after-mentioned display 6, the touch panel also functions as the operation unit 22.

A display 6 is provided on the housing 2. The display 6 is arranged on the upper surface (top plate) of the housing 2 in the illustrated example.

The display 6 is a display that displays various display screens on the basis of the image data, and the like output from the after-mentioned controller 11. The size, specific position, and the like of display 6 are not limited to the illustrated example.

The display 6 consists of, for example, a liquid crystal display (LCD), organic electroluminescent display, or other flat display. The touch panel may be integrally formed with the surface of the display 6. In this case, the touch panel also functions as the operation unit 22.

In the embodiment, finger image PI (first finger image PIt and second finger image PIs to be described later, see FIG. 3) obtained by photographing the finger U including the nail T placed in the printing device 1, and the like are displayed on the display 6. As mentioned later, in the embodiment, a range including "specific part" is photographed with a camera 51, to obtain photographed image PT (first photographed image PTt and second photographed image PTs to be described later, see FIGS. 5 and 6). This photographed image PT may be displayed on the display 6. The comparison image PS (first comparison image PSt and second comparison image PSs to be described later, see FIG. 4) obtained by photographing a range including "specific part" in an initial state (first state) and the photographed image PT may be displayed side by side so that the comparison can be visually confirmed.

The content displayed on the display 6 is not limited to images such as the finger image PI. For example, the display 6 may show a nail design entered or selected by the user from the operation unit 22, and various instructions, guidance, and warnings to the user.

In the embodiment, as described below, the controller 11 as the determiner determines the state of "specific part" (in the embodiment, dirt degree), and the display 6 also functions as an informing unit of informing the user of the response, etc. according to the determination results.

A finger stage 3 to place the finger U inserted from the opening 21 is provided at the position corresponding to the opening 21 inside the housing 2.

The finger stage 3 includes a stage body 31 on which the finger U is to be placed. The central portion in the width direction of the stage body 31 is somewhat depressed along a long direction so that the finger U is placed stably. The stage body 31 may include a cushion member formed of a material that has a flexibility such as a resin, for example.

The front side of the finger stage 3 (front side in Y direction in FIG. 1) is surrounded by a frame portion 32. The top surface of the frame portion 32 functions as a finger presser that regulates the position in the upper direction of the finger U by having the upper side of the finger U placed in the finger stage 3 butt against the top surface of the frame portion 32.

The upper portion on the back side (back side in Y direction in FIG. 1) of the finger stage 3 is open, so that the surface of nail T of the finger U which was inserted from the opening 21 and placed in the finger stage 3 is exposed.

A butting portion 33 is provided on the back side of the finger stage 3. The tip of the finger U placed in the finger stage 3 butts against the butting portion 33. When the nail T extends beyond the tip of the finger U, the tip of the nail T can be hooked onto the butting portion 33, and thus, the butting portion 33 also functions as a nail placement portion.

It is not essential to provide the frame portion 32 and the butting portion 33. The frame portion 32 and the butting portion 33 may not be provided.

A mirror 35 is provided near the position where the finger U is placed. In the embodiment, the mirror 35 is provided on the left side of the stage body 31. The number and the placement position of the mirror(s) 35 are not limited to this example. A mirror(s) may also be provided on the right side of the stage body 31, on the tip side of the finger U, etc.

The mirror 35 is made of synthetic resin, for example, using acrylic or other material as a base material. The material of the mirror 35 is not particularly limited, and a mirror made of glass using glass for the base material may be used, for example.

The mirror 35 is an auxiliary reflector that assists in photography when photographing the finger U placed in the finger stage 3 with the camera 51 to be described later. To be specific, the mirror 35 is an optical element capable of keeping, within the photographable range of the camera 51, the finger image from a direction (e.g., lateral direction) different from one direction (e.g., upper direction) in which the camera 51 can directly perform photographing.

Since the image of finger U including the nail T seen from the lateral direction can be obtained with the camera 51 via the mirror 35, it is possible to detect the position in the height direction of the nail T.

The finger stage 3 and the mirror 35 are "specific part" in the embodiment. The finger stage 35 and the mirror 35 which are "specific part" change the state over time.

The state of "specific part" is, for example, the dirt degree of "specific part". As mentioned later, in the embodiment, the printing device 1 which is the electronic device includes a print head 41 which performs printing by ejecting ink. During printing, ink (ink mist, etc.) is scattered.

Figure 5:
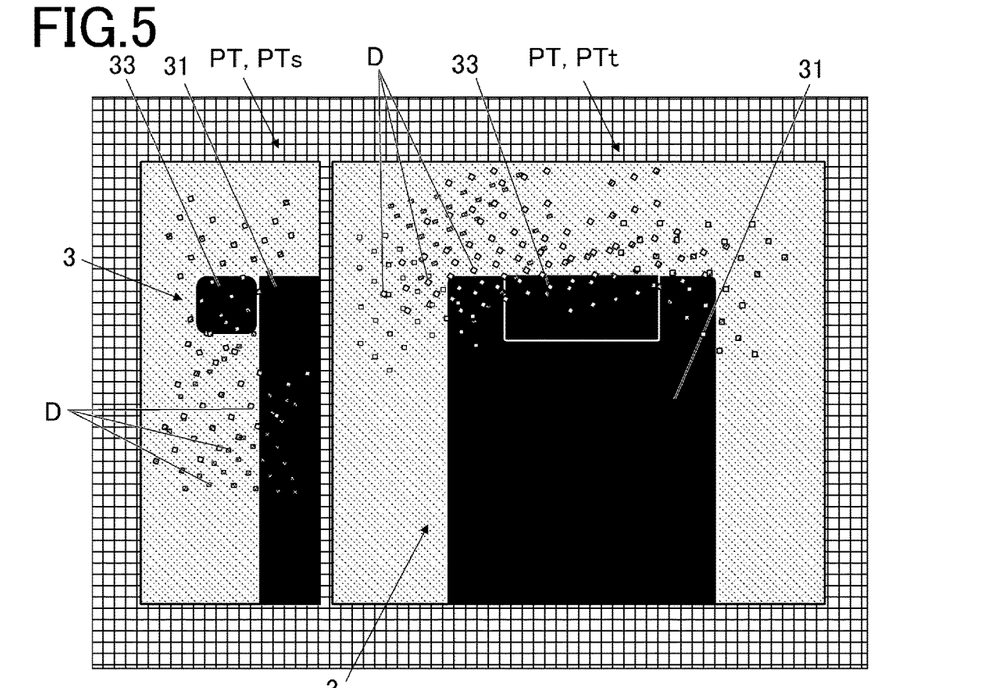
FIG. 5 is a plan view showing an example of a photographed image.
Figure 6:
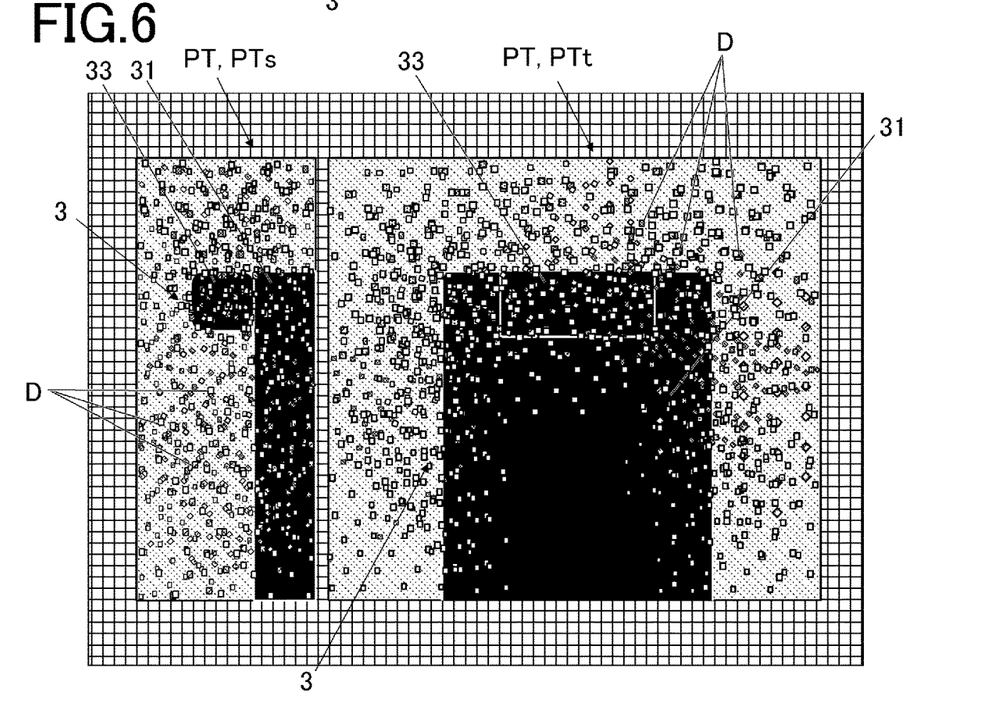
FIG. 6 is a plan view showing an example of a photographed image.

The state of the finger stage 3 and the mirror 35 that are "specific part" changes over time as the device is used, due to adhering of such ink (ink mist, etc. that did not land on nail T which is the printing target), sebum from the finger U placed inside the device, and various types of dust (in FIGS. 5 and 6, dots show the dirt D adhering). The factors that cause the state of "specific part" to change over time are not limited to the cause shown here. For example, when the print head 41 is detached from the device for replacement, ink may be expected to adhere to the finger stage 3 or the mirror 35 due to the finger stage 3 or the mirror 35 contacting the surface where the ink is ejected.

In the embodiment, the finger U including the nail T placed in the finger stage 3 is photographed with the camera 51, and the shape and position of the nail T which is the printing target are identified (detected) from the image obtained by photographing (finger image PI to be described later, see FIG. 3).

Thus, the finger stage 3, especially the stage body 31 where the finger U is placed and its surrounding portion, is formed of a black or other color material that is easily distinguished from skin color, so that it contrasts clearly with the nail T, etc. (see FIGS. 3 to 6).

For example, if the finger stage 3, which is "specific part" gets dirty with ink or other substances, the black material will gradually become whitish and the contrast will decrease, making it difficult to identify the outline that demarcates the area of the nail T.

If, for example, the mirror 35 gets dirty with ink, the image reflected in the mirror 35 becomes blurred, and it becomes difficult to identify (detect) the nail T that is the printing target from the image obtained by photographing the mirror 35 (finger image PI (second finger image PIs) described below, see FIG. 3).

Thus, when "specific part" such as the finger stage 3 and the mirror 35 becomes dirty, it is preferable to remove dirt D (see FIGS. 5 and 6).

FIG. 2 is a main part block diagram showing the control configuration of the printing device and the terminal device that cooperates with the printing device in the embodiment.

As shown in FIG. 2, the printing device 1 includes a printing mechanism 4, a photographing unit 5, a communication unit 25, etc. in addition to the operation unit 22 and the display 6 described above.

The photographing unit 5 includes the camera 51 and a light source 52.

The portion around the camera 51 and the light source 52 are surrounded by a protecting member (not shown in the drawings) formed of a transparent resin material such as acrylic plate, for example, preventing the dirt such as ink (ink mist) from directly adhering to the lens of camera 51 or the like.

Though the shape of protecting member and the range to provide the protecting member are not particularly limited, the protecting member is preferably arranged at least on the side facing the finger stage 3 in the camera 51 and the light source 52. The material to form the protecting member is not limited to the acrylic plate. The protecting member may be formed of any material, for example, glass, as long as it does not obstruct photographing by the camera 51 and illumination by the light source 52.

The camera 51 is a compact photographic device, for example, composed of a solid-state photographic element having approximately two million pixels or more and a lens, etc. The camera 51 is an image obtainer that obtains various images by photographing the finger U including the nail T placed in the printing device 1, the finger stage 3 and the mirror 35 that are "specific part", and the like. The light source 52 is an illumination lamp, such as a white LED.

The photographing unit 5 illuminates, with the light source 52, the photographing target such as the finger U placed in the finger stage 3, the nail T, and "specific part". The camera 51 is used to photograph the finger U, "specific part", and the like, to obtain the finger image PI (image of finger U including the nail image, see FIG. 3), photographed image PT (image including "specific part" and not including the finger U or the nail T, see FIGS. 5 and 6), and the like (image of photographing target).

Figure 3:
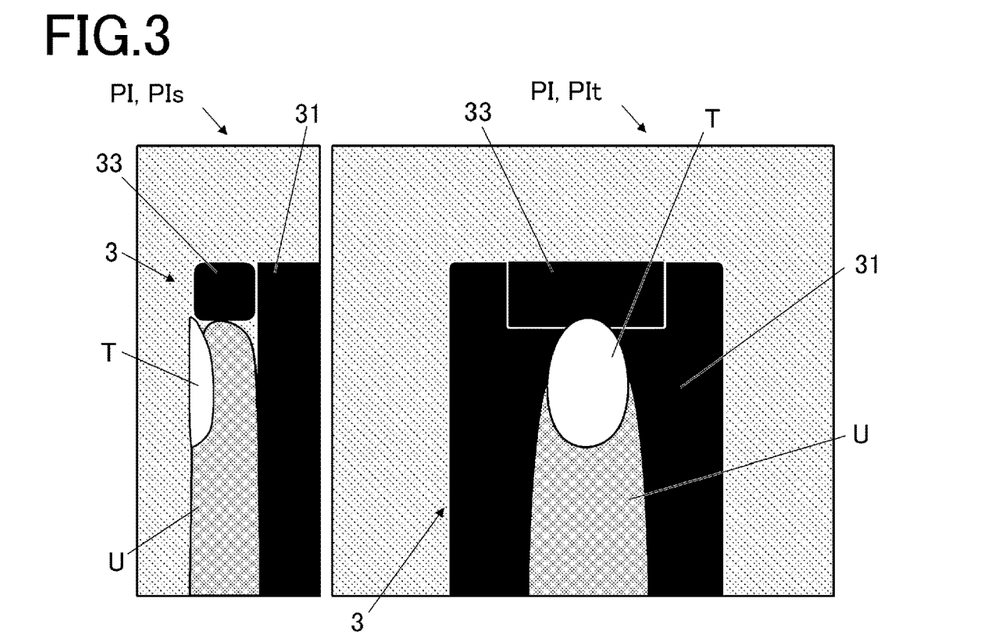
FIG. 3 is a plan view of an example of a finger image capturing a finger including a nail.

FIG. 3 is a view showing an example of the finger image photographed by the camera.

In the embodiment, the camera 51 is arranged on the inner side of the upper surface of the printing device 1. As shown in FIG. 3, the camera 51 is able to obtain the finger image PI (upper image, first finger image PIt, see the right side of FIG. 3) of the finger U seen from the upper direction.

The camera 51 is configured to be able to obtain the finger image PI within the photographable range via the mirror 35 which is the auxiliary reflector (in the embodiment, finger image of the finger U seen from the lateral direction, lateral image, second finger image PIs, see left side of FIG. 3).

In such a way, by enabling to photograph the image via the mirror 35 as well as the image which can be directly obtained from the position where the camera 51 is arranged, it is possible to obtain finger images of the finger U seen from multiple directions by photographing from one direction (upper direction in the embodiment) without changing the position and angle of the camera 51 itself. The photographing itself may be performed once or may be performed multiple times by changing the illuminance and focus of the light source 52, for example.

When image data including the first finger image PIt (upper image) and second finger image PIs (lateral image) in one image is obtained, as shown in FIG. 3, the first finger image PIt (upper image) and second finger image PIs (lateral image) may be displayed side by side on the display 6 as a single image, for example.

Alternatively, the first finger image PIt (upper image) and second finger image PIs (lateral image) may be individually cut out from the one image and displayed separately on the display 6 or the like. The first finger image PIt (upper image) and second finger image PIs (lateral image) may be individually obtained as separate images, and separately displayed on the display 6.

In the embodiment, as shown in FIGS. 5 and 6, the photographing unit 5 photographs the portion including the finger stage 3 to obtain the photographed image PT including "specific part" in a state in which the finger U including the nail T is not placed. That is, the photographed image PT (upper image, first photographed image PTt, see right side of FIGS. 5 and 6) of the portion including the finger stage 3 seen from the upper direction, and the photographed image PT (lateral image, second photographed image PTs, see left side of FIGS. 5 and 6) of the portion including the finger stage 3 seen from the lateral direction via the mirror 35 can be obtained.

The photographed image PT is an image necessary to perform determination (diagnosis) of the dirt degree of "specific part". The timing for obtaining the photographed images PT can be, for example, at the beginning of use of each day (e.g., when the power is turned on), when the user of the printing device 1 is changed, or when the printing device 1 exceeds a certain cumulative usage time.

The image data of finger image PI, photographed image PT, and the like obtained by the photographing unit 5 may be stored in an after-mentioned storage 12.

Figure 4:
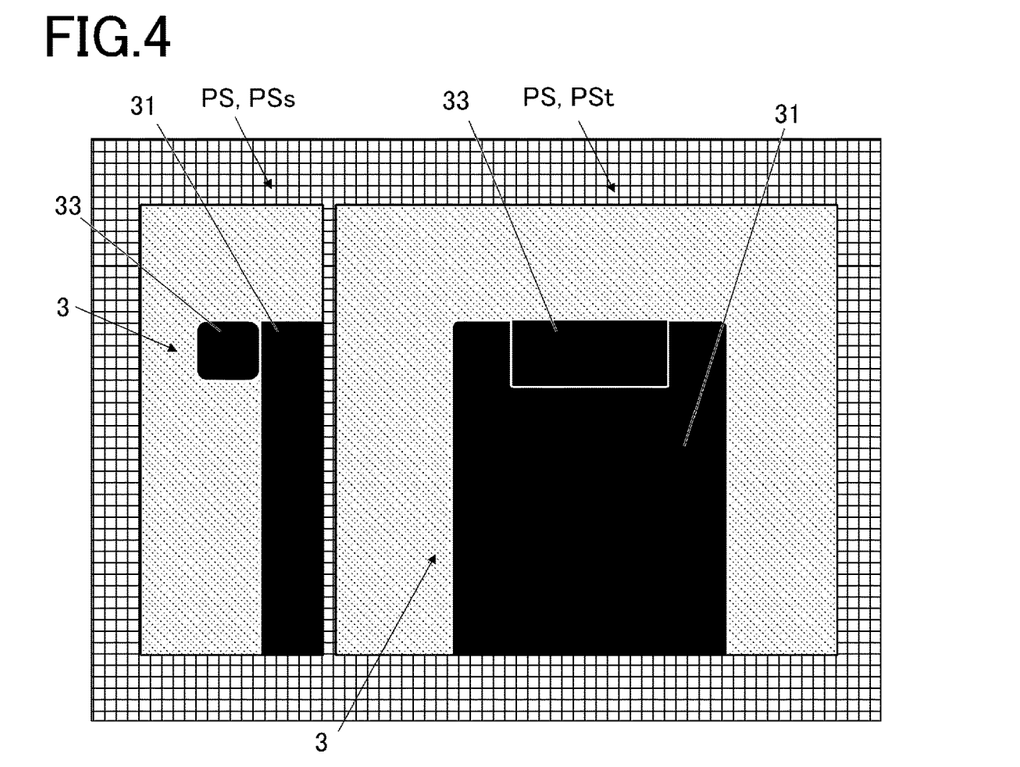
FIG. 4 is a plan view showing an example of a comparison image.

In the embodiment, comparison image PS (first comparison image PSt that is a comparison image PS of the portion including the finger stage 3 seen from the upper direction, second comparison image PSs that is a comparison image PS of the portion including the finger stage 3 seen from the lateral direction, see FIG. 4) obtained by photographing the range including "specific part" in the first state with the camera 51 of the photographing unit 5 is stored in the storage 12, or the like.

The "first state" is a state before use of device by the user, such as an initial state at the time of factory shipment of the printing device 1, for example. The comparison image PS is obtained before shipment and stored in the storage 12, for example.

The timing for obtaining the comparison image PS by photographing the range including the "specific state" in the first state is not limited to the factory shipment (before factory shipment, at factory shipment) as long as the comparison image PS is an image without the dirt D adhering to "specific part" such as the first stage 3. For example, the comparison image PS may be obtained before the printing operation is performed after the printing device 1 has been delivered to the user.

Since the comparison image PS is to be compared with the photographed image PT, it is preferable that the comparison image PS is obtained under conditions (for example, angle when illuminating and photographing are performed) equal to the condition under which the photographed image PT is obtained.

As shown in FIG. 2, the printing mechanism 4 includes a print head 41, an X-direction moving motor 45 and a Y-direction moving motor 47 (see FIG. 2) as a head mover.

In the print head 41 of the embodiment, the surface (surface on the lower side) facing the nail surface serves as the ink ejection surface including multiple nozzle openings (none of them shown in the drawings) to eject inks. The print head 41 is an inkjet type printer that performs printing by making micro droplets of ink and directly spraying (ejecting), from the ink ejection surface, the ink onto the nail surface. The specific ink ejection method and the like are not particularly limited. Though the configuration of the print head 41 is not particularly limited, the print head 41 is a cartridge-integrated head which has the ejection mechanism section such as the ink ejection surface integrated with the ink cartridge to pool the ink, for example.

The print head 41 is able to eject color inks such as cyan (C), magenta (M) and yellow (Y), for example. The type and number of the print head 41 are not particularly limited. For example, a print head for base which prints a liquid agent (e.g., white ink) as a base before printing the design may be provided in addition to the print head which ejects color inks as described above.

The X-direction moving motor 45 consists an X-direction moving mechanism that moves the print head 41 in the left-right direction (X direction) of the device, and the Y-direction moving motor 47 consists a Y-direction moving mechanism that moves the print head 41 in the front-rear direction (Y direction) of the device. The X-direction moving motor 45 and the Y-direction moving motor 47 are stepping motors, for example, and move the print head 41 in XY direction as needed.

The printing mechanism 4 includes a position detecting sensor 48 for detecting the position of the print head 41. The position detecting sensor 48 is an origin sensor to detect the origin position in the X direction and the Y direction of the print head 41, an encoder sensor that grasps the movement status of the print head 41, or the like.

The specific type and configuration of the position detecting sensor 48 are not particularly limited.

In the embodiment, the printing device 1 obtains via an external device the data of the design (nail design) to be printed on the nail T. The printing device 1 includes the communication unit 25 that performs transmission and reception of information with the external device. The external device in the embodiment is an after-mentioned terminal device 8 and various servers, for example.

The communication between the printing device 1 and the external device is performed by a wireless LAN, for example. The communication between the printing device 1 and the external device is not limited to this, and any method may be adopted. For example, network lines such as internet may be used, or wireless communication based on the short-range wireless communication standards such as Bluetooth (registered trademark) and Wi-Fi may be used. This communication is not limited to the wireless connection method, and transmission and reception of various data between them may be performed by wired connection. The communication unit 25 includes an antenna chip corresponding to the communication method, communication standard of various external devices expected to communicate with the communication unit 25.

The control device 10 mounted on the printing device 1 is a computer that includes: a controller 11 configured by including a processor such as a CPU (Central Processing Unit) not shown in the drawings; and a storage 12 configured by including a ROM (Read Only Memory), a RAM (Random Access Memory) not shown in the drawings, and the like.

The storage 12 stores various programs for operating the printing device 1, and various data in the ROM, for example.

Particularly, in the embodiment, data of the comparison image PS photographed at the time of factory shipment or the like (first comparison image PSt which is a comparison image PS of the portion including the finger stage 3 seen from the upper direction, second comparison image PSs which is a comparison image PS of the portion including the finger stage 3 seen from the lateral direction, see FIG. 4) is stored in a nonvolatile memory, which is not reset even when the power is turned off, in the storage 12.

The operation of components of the printing device 1 are integrally controlled by the controller 11 loading and executing the various programs stored in the ROM or the like into the working area of RAM.

That is, the controller 11 executes various functions for the printing device 1 to perform printing and determination processing in the embodiment by cooperation with the program (e.g., printing processing application program, determination processing application program).

The functions of the controller 11 may be executed by the controller 11 executing the program (software) or may be executed by a dedicated module (hardware).

In the embodiment, the controller 11 functions as a determiner that determines the state (dirt degree, e.g.) of "specific part" from the image, in addition to a printing controller that controls the operation of the components in the printing mechanism 4, a photographing controller that controls the operation of the components of the photographing unit 5, and a display controller that controls the operation of the display 6.

The controller 11 as the printing controller operates the print head 41 and each motor (X-direction moving motor 45, Y-direction moving motor 47) of the printing mechanism 4 to print various designs (nail designs) on the nail T of the finger U placed in the finger stage 3 according to the printing data. The printing data may be generated by the controller 11 or may be received from an external device such as the terminal device 8 via the communication unit 25.

The controller 11 as the display controller controls the operation of the display 6 to perform displaying according to various image data.

The controller 11 as the display controller controls the display 6 to display various messages, warning, and the like according to the determination result by the controller 11 as the determiner, and causes the display 6 to function as an informer that informs the response according to the determination result of the user.

The controller 11 as the photographing controller controls the operation of the camera 51 and the light source 52 of the photographing unit 5 to obtain the finger image PI, photographed image PT, and the like.

The various dirt D (see FIGS. 5 and 6) adhering to "specific part" such as the finger stage 3 and the mirror 35 are expected to be seen and have light reflections in various manners, such as dirt D which is easier to see at higher illuminance, and dirt D which is easier to see if the illuminance is somewhat reduced. Thus, the controller 11 as the photographing controller controls the photographing unit 5 to perform photographing multiple times by changing the photographing conditions such as the lighting illuminance (illuminance degree) of the light source 52 so as to obtain the image under the optimum photographing conditions according to each dirt D when photographing the photographed image PT.

The controller 11 as the determiner determines the state of "specific part" (dirt degree in the embodiment) by comparing the comparison image PS (first comparison image PSt, second comparison image PSs) obtained by photographing the range including "specific part" in the first state (initial state) with the photographed image PT (image capturing the current state of the portion including the finger stage 3 without the finger U placed therein, first photographed image PTt and second photographed image PTs) including "specific part".

The method for determining the dirt degree of "specific part" by the controller 11 as the determiner is not particularly limited. For example, the controller 11 uses the differential method (comparative method) that compares the photographed image PT (first photographed image PTt, second photographed image PTs) which is the current image with the comparison image PS (first comparison image PSt, second comparison image PSs) which is the image of a normal state (clean state before becoming dirty due to use), and that evaluates the difference.

The optimum image processing conditions and the like may be different by "specific part" such as the finger stage 3 and mirror 35. Thus, it is preferable that the controller 11 cuts off each "specific part" from the image and compares between the same parts.

The specific processing method of the differential method (comparative method) is not particularly limited. For example, a difference filter that outputs a difference image of the gradation difference obtained by overlaying the comparison image PS and the photographed image PT may be used to extract the part of the photographed image PT that has changed from the comparison image PS, which is the image of the first state (initial state).

For example, each value of RGB is compared for each one dot between the comparison image PS and the photographed image PT, and the difference for the dot having a gradation difference (difference in density or brightness of each RGB color) is extracted. In FIGS. 4 to 6, the smallest unit (e.g., 1 pixel, 1 dot, etc.) for comparing images is schematically shown as a grid (square) for the sake of illustration, but the actual comparison targets are in even finer grid units.

By extracting the difference between the comparison image PS and the photographed image PT in such a way, it is possible to identify the part that has changed from the first state (initial state).

In the embodiment, the threshold for determining the dirt degree is determined in advance. The controller 11 as the determiner determines the state of "specific part" on the basis of this threshold.

That is, for example, when an area of the region having the difference detected in the entire image (total area, total dot) becomes a certain area value or more that exceeds the threshold, the controller 11 determines that the state of "specific part" is of the dirt degree that requires cleaning.

The determination criteria of dirt degree by the controller 11 as the determiner is not limited to the size of area for which the difference was detected. For example, the determination criteria may be the size of difference (that is, density of dirt) and the like. Both of the size of area and the size of difference may be considered to determine the dirt degree.

The threshold regarding the degree of area value and difference size to determine that cleaning is necessary is set as needed. Different thresholds may be set to the first photographed image PTt capturing the portion including the finger stage 3 and the second photographed image PTs capturing the mirror 35.

The controller 11 may also function as a printing data generator that generates printing data by performing image processing for the finger image PI and thereby detecting the nail outlie defining the region of the nail T of the finger U placed in the finger stage 3 from the finger image PI and fitting a desired design (nail design) to the inner region of this nail outline. In this case, various types of corrections may be performed to the printing data according to the curve shape or the like of the nail.

To be specific, the controller 11 cuts out the image data of the design (nail design) selected by the user, performs adjustment of enlargement/reduction, position and the like as needed and fits the image data into the nail outline obtained from the finger image.

When information on the curvature and the like of the nail T is obtained, the controller 11 may perform curved surface correction and the like to the printing data as needed on the basis of the curvature of the nail T. It is possible to generate the printing data more suitable to the nail shape when the curved surface correction and the like are performed.

The printing device 1 in the present embodiment is configured to cooperate with the terminal device 8 as an external device.

The terminal device 8 in the embodiment is, for example, a mobile terminal device such as a smartphone or a tablet terminal. The terminal device 8 is not limited to the smartphone as long as the terminal device 8 can communicate with the printing device 1. For example, the terminal device 8 may be a terminal device for a game, or the like.

As shown in FIG. 2, the terminal device 8 includes an operation unit 83, a communication unit 84, a display 85, a control device 80, and the like.

The operation unit 83 can perform various inputs and settings according to user operations. When the operation unit 83 is operated, an input signal corresponding to the operation is transmitted to the control device 80. In the present embodiment, a touch panel is integrally provided on the surface of the display 85, and the user can perform various input/setting operations and the like by touch operations on the touch panel.

The operation unit 83 for performing various input/setting operations and the like is not limited to the touch panel. For example, various operation buttons, a keyboard, a pointing device, and the like may be provided as the operation unit 83.

Various inputting/setting and the like may be performed on the printing device 1 by operating the operation unit 83 of the terminal device 8. For example, the user may be able to start the printing operation of the printing device 1 by operating the operation unit 83.

The communication unit 84 is a communication unit that performs communication with the communication unit 25 of the printing device 1. For example, the communication unit 84 receives, from the printing device 1, data of the finger image PI obtained by photographing the finger including the nail placed in the printing device 1 with the camera 51, the photographed image PT, and the like.

The communication unit 84 includes a wireless communication module or the like that can communicate with the communication unit 25 of the printing device 1.

The communication unit 84 may be any communication unit that can communicate with the printing device 1, and a communication unit that meets the communication standard of the communication unit 25 of the printing device 1 is applied as the communication unit 84.

The display 85 consists of, for example, a liquid crystal display (LCD), organic electroluminescent display, or other flat display. The display 85 can display the image based on various image data, message screen to the user, various guidance screens, and warming display screen, for example, according to the control by the controller 81.

The message screen to the user, warming display screen, and the like may be displayed on the display 85 of the terminal device 8 together with or instead of being displayed on the display 6 of the printing device 1.

For example, when the controller 11 as the determiner determines regarding the dirt degree, the informing screen informing the user of the response may be displayed on the display 85 of the terminal device 8 according to this determination result. In this case, the display 85 of the terminal device 8 functions as an informing unit.

A touch panel for performing various types of input may be integrally formed with the surface of the display 85 as mentioned above. In this case, the touch panel also functions as the operation unit 83.

The control device 80 is a computer that includes a controller 81 configured by including a CPU (Central Processing Unit) not shown in the drawings and a storage 82 configured by including a ROM (Read Only Memory), a RAM (Random Access Memory) not shown in the drawings, and the like.

The storage 82 stores various programs for operating the components of the terminal device 8, various data, and the like.

To be specific, the ROM or the like in the embodiment stores various programs such as a print processing application program for performing printing processing using the printing device 1 and a display control processing application program (none of them shown in the drawings) in addition to the operation program for integrally controlling the components of the terminal device 8. The terminal device 8 is controlled by the control device 80 uploading these programs into the working area of RAM and executing these programs, for example.

The storage 82 may store data of the design (nail design) to be printed on the nail T by the printing device 1.

The controller 81 integrally controls the operation of components in the terminal device 8. The controller 81 achieves various functions for performing the printing processing by the printing device 1, processing of causing the display 85 to display an image for display, and the like by the cooperation with the programs (printing processing application program, etc.) stored in the storage 82.

Next, with reference to FIG. 7, the determination method in the embodiment will be described.

Figure 7:
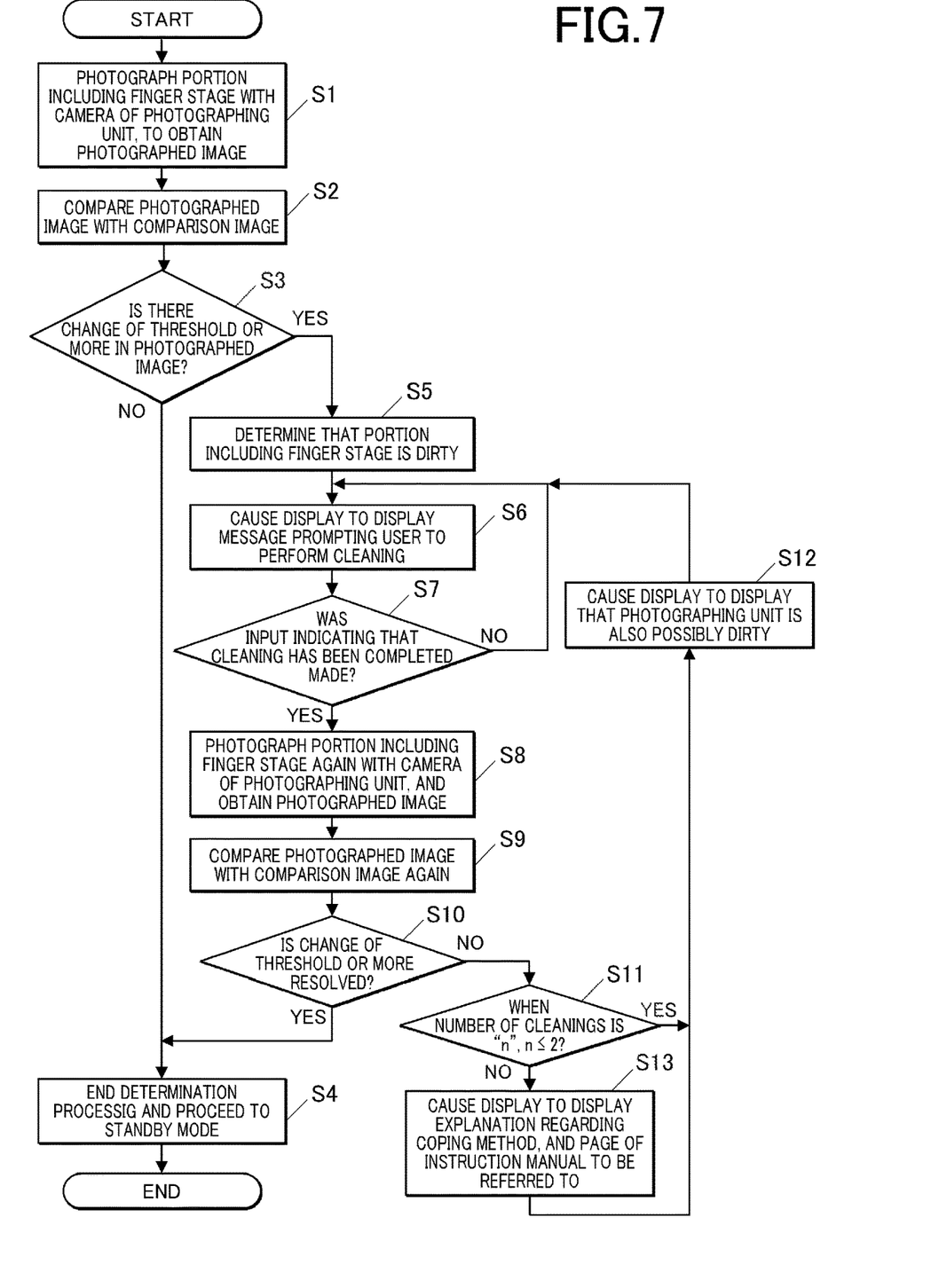
FIG. 7 is a flowchart showing determination processing in the present embodiment.

FIG. 7 is a flowchart showing the determination processing in the embodiment.

In the embodiment, as mentioned above, the determination processing of determining the state (dirt degree) of "specific part" such as the finger stage 3 and the mirror 35 before start of the printing operation of the day, at power-up, when the user using the printing device 1 is switched, when the printing operation of the day is finished, and the like.

To be specific, the portion including the finger stage 3 which is "specific part" (the portion including the finger stage 3 in a state in which the finger U is not placed) is first photographed with the camera 51 of the photographing unit 5, to obtain the photographed image PT (first photographed image PTt, second photographed image PTs) (step S1, image obtaining).

It is preferable to obtain multiple photographed images PT photographed under different conditions by performing photographing multiple times while changing the photographing condition such as illuminance of the light source 52. The number of photographing to be photographed and conditions under which the photographing is to be performed, and the like are set as needed. The photographed image PT which was obtained by the photographing is obtained by the controller 11.

When the photographed image PT is obtained, the controller 11 as the determiner reads out the comparison image PS (first comparison image PSt, second comparison image PSs) from the storage 12, and compares the comparison image PS with the photographed image PT for each corresponding part, to obtain the difference (step S2, determining).

When photographing has been performed multiple times by changing the conditions, comparison with the comparison image PS is performed for all the photographed images PT that were obtained.

To be specific, for each photographed image PT, the first photographed image PTt seen from the upper direction is compared with the first comparison image PSt seen from the same direction, and the second photographed image PTs seen from the lateral direction is compared with the second comparison image PSs seen from the same direction.

The controller 11 then obtains the total area of dots for which the difference was detected by comparison with the first comparison image PSt and the second comparison image PSs, for the first photographed image PTt and the second photographed image PTs, respectively.

The controller 11 determines whether there is a change of a threshold or more in the photographed image PT in comparison with the comparison image PS, that is, the controller 11 determines whether the number of dots having the difference is larger than the predetermined threshold or not by comparing with the comparison image pS (step S3).

If there is no change of the threshold or more (step S3; NO), the controller 11 once ends the determination processing and proceeds to standby mode (step S4). To be specific, the controller 11 starts the printing operation by the printing mechanism 4 if the printing operation instruction is made thereafter, and the controller 11 stops all the operation in this state if the power is turned off.

For example, as shown in FIG. 5, when each photographed image PT (first photographed image PTt, second photographed image PTs) is only slightly dirty, the total area of dots for which the difference was detected is small and does not exceed the threshold (step S3; NO). In this case, the user is not to be prompted to perform cleaning and can continue to use the printing device 1.

On the other hand, if there is a change of the threshold or more in the photographed image PT (step S3; YES), the controller 11 determines that the portion including the finger stage 3 which is "specific part" is dirty (step S5), causes the display 6 of the printing device 1 to display a message prompting the user to perform cleaning, and informs the user of the response corresponding to the determination result (step S6). At this time, the display 85 of the terminal device may also perform similar displaying.

For example, in each photographed image PT (first photographed image PTt, second photographed image PTs), as shown in FIG. 6, when the portion including the finger stage 3 which is originally a black member is white with ink (see "first photographed image PTt" in FIG. 6), and when the mirror 35 is so dirty that the portion including the finger stage 3 can only be seen indistinctly (see "second photographed image PTs" in FIG. 6), if photographing is performed to obtain the finger image PI in this state, it may not be possible to correctly detect the nail outline from the finger image PI. In addition, if the user places his/her finger U in the finger stage 3 in such a state, there is a concern that ink or other substances may adhere to the finger U or the nail T, causing it to become dirty. In such cases, the dirt degree is such a degree that prompts the user to perform the cleaning, and the total area of dots for which the difference is detected is large.

In the embodiment, whether or not there is a change of a threshold or more is determined for each of the first photographed image PTt of the portion including the finger stage 3 seen from the upper direction and the second photographed image PTs of the portion including the finger stage 3 seen from the lateral direction. If there is a change in the first photographed image PTs, the portion including the finger stage 3 is considered dirty. On the other hand, if there is a change in the second photographed image PTs, the mirror 35 reflecting the lateral surface of the finger stage 3 is considered dirty.

In the embodiment, the controller 11 determines that the portion including the finger stage 3 which is "specific part" is dirty if there is any one of the dirt D of the finger stage 3 appearing in the first photographed image PTt and the dirt D of the mirror 35 appearing in the second photographed image PTs.

Which of the first photographed image PTs and the second photographed image PTs exceeds the threshold to what degree may be displayed on the display 6 and the like.

For example, when the first photographed image PTt does not exceed the threshold so much but the second photographed image PTs greatly exceeds the threshold, the device may inform the user that the mirror 35 is especially dirty. This enables the user to know where especially to clean.

When the user performs the cleaning according to the informed contents, the user inputs that the cleaning has been completed from the operation unit 22 or the like. For example, "cleaning completion button" is provided on the touch panel or the like, and the user operates this "cleaning completion button" when the user has performed cleaning.

When the input operation that the cleaning has been completed (e.g., operation of "cleaning completion button") is made, the signal corresponding to the input is output to the controller 11.

The controller 11 determines whether an input indicating that the cleaning has been completed was made (step S7). If the input is not confirmed (step S7; NO), the controller 11 returns to step S6, and repeats the display processing of the message.

On the other hand, if an input indicating that cleaning has been completed was made (step S7; YES), the controller 11 controls the camera 51 of the photographing unit 5 to photograph the portion including the finger stage 3 which is "specific part" again, to obtain the photographed image PT (first photographed image PTt, second photographed image PTs) (step S8).

When the photographed image PT capturing the current state is obtained, the controller 11 as the determiner reads out the comparison image PS (first comparison image PSt, second comparison image PSs) from the storage 12, and compares the comparison image PS with the photographed image PT again and obtains the difference (step S9).

The controller 11 then determines whether or not the change of threshold or more which has occurred in the photographed image PT is resolved (step S10).

If the cleaning by the user is done correctly, the dirt D of the portion including the finger stage 3 which is a "specific part" should be removed, and the difference with respect to the comparison image PS is resolved. If the change of threshold or more which has occurred in the photographed image PT is resolved (step S10; YES), the controller 11 proceeds to step S4, and ends the determination processing.

On the other hand, if the change of threshold or more which has occurred in the photographed image PT is not resolved (step S10; NO), the controller 11 determines whether "n" is smaller than three when the number of cleanings (number of loops from step S7 to step S10) is "n" (step S11).

In the embodiment, the cleaning by the user and the determination regarding the dirt degree are repeated until the change of threshold or more is resolved, and the number of repeated determinations is stored.

If "n" is one or two (step S11; YES), the controller 11 causes the display 6 or the like to display that the photographing unit 5 is also possibly dirty to inform the user (step s12), and causes the display 6 or the like to display a message prompting the user to perform cleaning (step S6), and repeats subsequent processes.

When the change of threshold or more is not resolved (when the dirt D remains) even though the user has cleaned the finger stage 3 or the like, there is a possibility that the cause is in the photographing unit 5 that was not the cleaning target. Thus, the controller 11 shows the user the possibility that the photographing unit 5 is dirty, and performs displaying prompting the user to perform further cleaning.

On the other hand, if "n" is three or more (step S11; NO), the controller 11 causes the display 6 or the like to display explanation regarding the coping method, a message indicating the page(s) of the instruction manual to be referred to, and the like (step S13), causes the display 6 or the like to display that the photographing unit 5 is also possibly dirty to inform the user (step S12), causes the display 6 or the like to display a message prompting the user to perform cleaning (step pS6), and repeats subsequent processes.

When the dirt D of threshold or more remains even though the possibility that the photographing unit 5 is dirty is shown and then cleaning is repeated three times or more, there is assumed the state in which the dirt D is not resolved even when the cleaning is performed, such as the case where the user performs cleaning incorrectly or the case where the mirror 35 or the like is broken and damaged.

Thus, for example, informing is made suggesting the correct way of cleaning and the coping method other than cleaning such as how to replace the mirror 35 to the user, and furthermore requiring the user to respond.

If the situation is not improved even after an arbitrary number of repetitions (e.g., six times), setting may be made to stop the process by indicating, for example, the contact information of the service department.

When the printing operation is performed with "specific part" of the finger stage 3, the mirror 35, or the like remaining dirty, the nail outline is not recognized correctly even when the finger image PI is obtained, and there is a possibility that proper nail printing cannot be performed. In this respect, by determining the state of "specific part" and requiring the user to respond as needed as in the embodiment, "specific part" such as the finger stage 3 and the mirror 35 is maintained in an appropriate state without the dirt D, and it is possible to suppress the reduction of identification accuracy of the nail T which is the printing target.

When ink adheres to the portion where the finger U is placed, such as the finger stage 3, or its surrounding portion, there is a concern that the ink will adhere to the user's finger U or the nail T and stain the finger U, etc. when it is next used. By grasping the dirt degree of the finger stage 3 or the like and prompting the user to perform cleaning as in the embodiment, it is possible to prevent the finger U and the like from getting dirty.

As described above, the printing device 1 which is the electronic device in the embodiment includes: a camera 51 as an image obtainer that obtains a finger image including the nail which is the printing target and a photographed image PT "specific part" (e.g., finger stage 3, mirror 35, etc.) whose state changes over time; and a controller 11 as a determiner that determines the state of "specific part" by comparing the photographed image PT with the comparison image PS obtained by photographing a range including "specific part" in a first state (initial state).

The printing device 1 that performs printing on the printing target such as the nail T has the camera 51 which photographs the printing target (nail T) and obtains the finger image PI to recognize the printing target (mail T) in order to accurately grasp the range, shape, position and the like of the printing target (nail T).

In order to accurately recognize the region of nail T from the finger image PI, it is necessary to position the finger and nail in the finger stage 3 excellent in contrast to the finger U and nail T and obtain the upper image (first finger image PIt) of the nail T, obtain the lateral image (second finger image PIs) of the nail T via the mirror 35, and accurately grasp the position in the height direction of nail T.

In this regard, if ink or sebum from the finger U, etc. adheres to the finger stage 3, the finger stage 3, which should be a black background, becomes whitish, resulting in poor contrast with the finger U and the nail T (see the first photographed image PTt in FIG. 6). Depending on how the dirt D is attached, there is a concern that even the dirt D portion may be recognized as the nail T. If the finger image PI (first finger image PIt, see FIG. 3) is obtained in this state, there is a concern that the nail outline is wrongly recognized. If ink or sebum from the finger U, etc. adheres to the mirror 35, the mirror 35 becomes fogged up (see the first photographed image PTt in FIG. 6). Making it impossible to reflect a clear image. Also in this case, if the finger image PI (second finger image PIs, see FIG. 3) is obtained in this state, there is a concern that the nail outline is wrongly recognized.

In the embodiment, the comparison image PS capturing the first state (initial state) before use is compared with the photographed image PT capturing the current state of "specific part", and the change (dirt degree) is determined. Thus, it is possible to appropriately grasp the state of reducing the recognition accuracy of the nail T or the like, in advance. Since such determination of change (dirt degree) is performed by comparison process of image by the controller 11, it is possible to perform accurate determination compared to the case where the user or the like visually determines the presence/absence of the dirt D or the like.

In addition, it is possible to prevent the finger U or the like from getting dirty by preventing the user from continuing to use the finger stage 3 or the like in the dirty state.

Furthermore, in the embodiment, since the determination processing is performed on the basis of the image obtained by the camera 51 which the printing device 1 originally has, it is not necessary to add a new device configuration and it is possible to easily prevent the reduction in recognition accuracy of the nail T or the like.

According to the embodiment, "specific part" includes the finger stage 3 to place the finger U corresponding to the nail T which is the printing target and the mirror 35 as the auxiliary reflector that assists in photographing of the finer U and the nail T placed in the finger stage 3.

When the finger stage 3 and/or the mirror 35 is dirty, there is a high possibility that the outline of the nail T cannot be recognized correctly from the finger image PI.

In this regard, since the degree of condition change (dirt degree) of the finger stage 3 and the mirror 35 as "specific part" can be seen, it is possible to reduce the recognition accuracy of nail T which is the printing target.

In the embodiment, the state of "specific part" is the dirt degree of "specific part".

In the case where the "specific part" becomes dirty over time according to use, by enabling the determination of this dirt degree, it is possible to grasp the state of reducing the recognition state of the nail T or the like, in advance.

In the embodiment, the controller 11 which is the determiner determines the state of "specific part" on the basis of the predetermined threshold.

This allows objective determination of the state (dirt degree), and an appropriate response can be made.

In the embodiment, the printing device 1 further includes an informing unit that informs the user of response according to the determination result by the controller 11 which is the determiner.

To be specific, the display 6 or the display 85 of the terminal device is caused to display the dirt degree of "specific part", coping method, and the like, and thereby require the user to do a response such as cleaning.

Thus, when the dirt degree of "specific part" is severe (e.g., exceeds a threshold), cleaning, etc. can be performed to resolve the state that affects the recognition of the nail T. Thus, it is possible to grasp the state of reducing the recognition accuracy of the nail T or the like, in advance.

In the embodiment, the printing device 1 includes a printer that performs printing by ejecting ink. The state of "specific part" changes over time by adhering of the ink.

When printing is performed by ejecting ink, there is a concern that ink (ink mist) scatters during printing, etc. and adheres to objects around the nail T (e.g., finger stage 3, etc.).

If the nail recognition or printing is performed with such ink stains, there is a concern of misrecognizing the outline of the nail T or staining the finger U or the nail T with ink.

In this regard, the embodiment enables to grasp and cope with the changes over time in the finger state 3, etc. due to such ink stains. This suppresses the reduction in the recognition accuracy of the nail T or the like and prevents the finger U or the like from getting dirty by the ink.

Though the embodiment of the present disclosure has been described above, the present disclosure is not limited to such embodiment, and various modifications can be made within the scope of the present disclosure.

For example, though the case where "specific part" is the finger stage 3, the mirror 35 or the like is shown as an example in the embodiment, "specific part" is not limited to this.

Any portion around the position where the finger U or the nail T is placed can be broadly included in the "specific part".

Though the case where the state of "specific part" is the dirt degree of "specific part" is shown as an example in the embodiment, the state of "specific part" is not limited to the dirt degree.

For example, when the 35 mirror is cracked, chipped, or deformed due to various factors, they may also interfere with normal nail recognition. These cases may also be determined as the change in the state of "specific part".

In the embodiment, when the state of "specific part" changes by a constant threshold or more, this change is displayed by the display 6 (or display 85) to inform the user. However, the informing unit is not limited to the display 6 (or display 85).

For example, when the printing device 1 or the terminal device 8 includes an audio output unit, the output of alert sound or voice guidance of a message, etc. may inform the user. Lamp lighting or the like may inform the user that a response such as cleaning is necessary.

In these cases, the audio output unit, the lamp or the like is the informing unit.

In the embodiment, there is shown, as an example, a case of comparing the comparison image PS obtained by photographing at factory shipment with the photographed image PT of the current state when input of cleaning completion is made after prompting the user to perform cleaning. However, the image to be compared with the photographed image PT is not limited to the comparison image PS obtained by photographing at the factory shipment.

For example, when cleaning of "specific part" by the user was performed and input that cleaning has been completed has been made, the photographed image PT for confirming the state of "specific part" of the current state is obtained by photographing again, and this photographed image PT may be compared with the photographed image PT before cleaning. The comparison with the photographed image PT before cleaning enables comparing regarding which part of dirt D was resolved by the cleaning and which part of dirt D remains. By displaying such comparison image on the display 6 or the like, the user easily determines where to clean.

In the embodiment, though the case where the auxiliary reflector is the mirror 35 is shown as an example, the auxiliary reflector is not limited to the mirror. The auxiliary reflector may be any reflector as long as it enables the camera 51 to obtain the finger image of the finger U seen from a direction different from one direction, separate from the finger image of the finger U seen from the one direction from which the camera 51 can directly obtain the finger image. The auxiliary reflector may be various optical elements such as prism, for example.

In the embodiment, the case where the printing device 1 operates as a single device is shown as an example. However, the printing device 1 may perform the determination processing, printing processing and other processing in cooperation with various external devices such as the terminal device 8.

For example, inputting of the instruction to start the determination processing and the instruction to start the printing processing in the printing device 1 and selection of the nail design (design) may be performed from the operation unit 83 of the terminal device 8.

The processing using various data processes such as image processing including generation of printing data may be performed by external devices such as the terminal device 8. In this case, the finger image PI taken by the camera 51 of the printing device 1 or the like is transmitted to the terminal device 8.

The determination processing in the embodiment may also be performed by the external device such as the terminal device 8. In this case, for example, the program for performing the determination processing is stored in the storage 82 of the terminal device 8, and the controller 81 of the terminal device 8 functions as the determiner by cooperation with this program.

In this case, data of the photographed image PT taken by the camera 51 of the printing device 1 and the comparison image PS are transmitted to the terminal device 8, and the controller 81 of the terminal device 8 performs the determination processing on the basis of these pieces of data. The data of comparison image PS may be stored in advance in the storage 82 of the terminal device 8.

In such a way, if an external device such as the terminal device 8 is in charge of various processes, the controller 11 of the printing device 1 can be realized with a simpler configuration.

The nail design data does not have to be stored in the storage 12 of the printing device 1, but may be stored in the storage of various external devices, such as the terminal device 8, for example. The image data of nail design may be stored in the server device which is connectable via the network line, so that the user can refer to the data of nail design by accessing the server device.

In this way, it is possible to select the design to be printed from among a larger number of nail designs without increasing the capacity of storage 12 or the like.

The functional configuration in the embodiment is realized by the processor that performs arithmetic processing, and the processor that can be used in the embodiment includes processors composed of single devices of various processing devices such as single processors, multiprocessors, and multi-core processors. In addition, the processor includes these various processing devices combined with processing circuits such as ASICs (Application Specific Integrated Circuit) and FPGAs (Field-Programmable Gate Array).

When a series of processes are executed by software, the programs that make up the software are installed on a computer or other device from a network or the storage medium.

The computer may be a computer that is incorporated in dedicated hardware. The computer may also be a computer capable of performing various functions by installing various programs, e.g., a general-purpose personal computer.

The storage medium containing such a program consists not only of removable media distributed separately from the main body of the device to provide the program to the user, but also consists of the storage medium provided to the user in the state of being pre-incorporated in the main body of the device, etc. Removable media consists of, for example, magnetic disks (including floppy disks), optical disks, or magneto-optical disks. Optical discs consist of, for example, CD-ROM (Compact Disk-Read Only Memory), DVD (Digital Versatile Disk), and Blu-ray (registered trademark) Disc (Blu-ray Disc). Magneto-optical disks consist of MDs (Mini-Disks), etc.

In this specification, the steps describing the program recorded in the storage medium include not only processes that are performed chronologically according to their sequence, but also processes that are not necessarily performed chronologically and may be performed in parallel or individually.

What is claimed is:

1. An electronic device comprising:
   a finger stage configured to place a nail which is a printing target and a finger corresponding to the nail;
   a photographing unit that obtains a finger image including the nail;
   an auxiliary reflector configured to assist in photographing of the finger placed in the finger stage; and
   at least one processor that:
   performs control to obtain a first photographed image capturing a specific part including the finger stage and the auxiliary reflector with the photographing unit in a state in which the finger is not placed in the finger stage, and a second photographed image capturing the finger stage with the photographing unit via the auxiliary reflector from a direction different from a photographing direction of the first photographed image in a state in which the finger is not placed in the finger stage; and
   determines whether or not the finger stage and/or the auxiliary reflector in the specific part changes over time by comparing a comparison image that is obtained by photographing a range including the specific part in a first state with each of the first photographed image and the second photographed image.

2. The electronic device according to claim 1, wherein the at least one processor determines whether or not a dirt degree of the finger stage and/or the auxiliary reflector in the specific part changes over time.

3. The electronic device according to claim 2, wherein the at least one processor compares a gradation of each of multiple unit regions included in the comparison image with a gradation of each of multiple unit regions included in the photographed image for each unit region corresponding to each other, and extracts a unit region in the first photographed image and the second photographed image having a difference in a gradation from a corresponding unit region in the comparison image.

4. The electronic device according to claim 3, wherein the at least one processor determines a state of the specific part based on a threshold that is determined in advance.

5. The electronic device according to claim 1, wherein the at least one processor compares a gradation of each of multiple unit regions included in the comparison image with a gradation of each of multiple unit regions included in the photographed image for each unit region corresponding to each other, and extracts a unit region in the first photographed image and the second photographed image having a difference in a gradation from a corresponding unit region in the comparison image.

6. The electronic device according to claim 1, wherein the at least one processor determines a state of the specific part based on a threshold that is determined in advance.

7. The electronic device according to claim 1, wherein the at least one processor performs control to inform a user of a response according to a determination result.

8. The electronic device according to claim 1, wherein
the at least one processor performs control to print by ejecting ink, and
a state of the specific part changes over time by adhesion of the ink.

9. A determination method comprising:
obtaining that is performing, by at least one processor included in an electronic device, control to obtain a first photographed image capturing a specific part including a finger stage configured to place a nail which is a printing target and finger corresponding to the nail and an auxiliary reflector configured to assist in photographing of the finger placed in the finger stage with a photographing unit that obtains a finger image including the nail, the first photographed image being captured in a state in which the finger is not placed in the finger stage, and a second photographed image capturing the finger stage with the photographing unit via the auxiliary reflector from a direction different from a photographing direction of the first photographed image in a state in which the finger is not placed in the finger stage; and
determining whether or not the finger stage and/or the auxiliary reflector in the specific part changes over time by comparing a comparison image that is obtained by photographing a range including the specific part in a first state with each of the first photographed image and the second photographed image.

10. A non-transitory computer readable storage medium storing a program that is executable by at least one processor, the program causing the processor to perform:
obtaining that is performing control to obtain a first photographed image capturing a specific part including a finger stage configured to place a nail which is a printing target and finger corresponding to the nail and an auxiliary reflector configured to assist in photographing of the finger placed in the finger stage with a photographing unit that obtains a finger image including the nail, the first photographed image being captured in a state in which the finger is not placed in the finger stage, and a second photographed image capturing the finger stage with the photographing unit via the auxiliary reflector from a direction different from a photographing direction of the first photographed image in a state in which the finger is not placed in the finger stage; and
determining whether or not the finger stage and/or the auxiliary reflector in the specific part changes over time by comparing a comparison image that is obtained by photographing a range including the specific part in a first state with each of the first photographed image and the second photographed image.

* * * * *